United States Patent
Wang

(10) Patent No.: US 6,317,767 B2
(45) Date of Patent: Nov. 13, 2001

(54) METHODS AND SYSTEMS FOR PERFORMING SHORT INTEGER CHEN IDCT ALGORITHM WITH FUSED MULTIPLY/ADD

(75) Inventor: Naxin Wang, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/828,231

(22) Filed: Apr. 9, 2001

Related U.S. Application Data

(62) Division of application No. 09/304,645, filed on May 4, 1999, now Pat. No. 6,243,730.

(51) Int. Cl.[7] .................................................. G06F 17/14
(52) U.S. Cl. ........................................... 708/401; 708/402
(58) Field of Search ..................................... 708/401, 402

(56) References Cited

U.S. PATENT DOCUMENTS

| | | | |
|---|---|---|---|
| 4,510,578 | * | 4/1985 | Miyaguchi et al. . |
| 5,410,500 | * | 4/1995 | Ohki . |
| 5,590,066 | * | 12/1996 | Ohki . |
| 5,629,882 | * | 5/1997 | Iwata . |
| 5,724,278 | * | 3/1998 | Ohgose et al. . |
| 5,831,882 | * | 11/1998 | Katayama . |
| 6,006,246 | * | 12/1999 | Ohki . |

\* cited by examiner

*Primary Examiner*—Tan V. Mai
(74) *Attorney, Agent, or Firm*—Finnegan, Henderson, Farabow, Garrett & Dunner, L.L.P.

(57) ABSTRACT

Methods and apparatus for performing a fast two-dimensional inverse discrete cosine transform (IDCT) in a media processor are disclosed. A processor receives discrete cosine transform data and combines, in a first stage, the discrete cosine transform data with a first set of constants. In a media processor with a partitioned SIMD architecture, the discrete cosine transform data and first set of constants may be combined, for example, by multiplying the at least one input component with a first set of constants using a complex multiplication instruction. The output is transposed in a second stage and combined with constants in a third stage to obtain the pixel information of an image.

12 Claims, 12 Drawing Sheets

$$[H_{NXN,NXN}] = [I_{4X4}] \otimes [V_{4X4}] =$$

FIG. 3

$$[G_{N \times N, N \times N}] = [V_{4 \times 4}] \otimes [I_{4 \times 4}] =$$

$$\begin{bmatrix}
\frac{1}{\sqrt{2}} & 0 & 0 & 0 & \frac{1}{\sqrt{2}} & 0 & 0 & 0 & 0 & 0 & 0 & 0 & 0 & 0 & 0 & 0 \\
0 & \frac{1}{\sqrt{2}} & 0 & 0 & 0 & \frac{1}{\sqrt{2}} & 0 & 0 & 0 & 0 & 0 & 0 & 0 & 0 & 0 & 0 \\
0 & 0 & \frac{1}{\sqrt{2}} & 0 & 0 & 0 & \frac{1}{\sqrt{2}} & 0 & 0 & 0 & 0 & 0 & 0 & 0 & 0 & 0 \\
0 & 0 & 0 & \frac{1}{\sqrt{2}} & 0 & 0 & 0 & \frac{1}{\sqrt{2}} & 0 & 0 & 0 & 0 & 0 & 0 & 0 & 0 \\
\cdot & 0 & 0 & 0 & \cos(\frac{3\pi}{8}) & 0 & 0 & 0 & \cos(\frac{\pi}{8}) & 0 & 0 & 0 & 0 & 0 & 0 & 0 \\
0 & \cdot & 0 & 0 & 0 & \cos(\frac{3\pi}{8}) & 0 & 0 & 0 & \cos(\frac{\pi}{8}) & 0 & 0 & 0 & 0 & 0 & 0 \\
0 & 0 & \cdot & 0 & 0 & 0 & \cos(\frac{3\pi}{8}) & 0 & 0 & 0 & \cos(\frac{\pi}{8}) & 0 & 0 & 0 & 0 & 0 \\
0 & 0 & 0 & \cdot & 0 & 0 & 0 & \cos(\frac{3\pi}{8}) & 0 & 0 & 0 & \cos(\frac{\pi}{8}) & 0 & 0 & 0 & 0 \\
-\frac{1}{\sqrt{2}} & 0 & 0 & 0 & 0 & 0 & 0 & 0 & \frac{1}{\sqrt{2}} & 0 & 0 & 0 & 0 & 0 & 0 & 0 \\
0 & -\frac{1}{\sqrt{2}} & 0 & 0 & 0 & 0 & 0 & 0 & 0 & \frac{1}{\sqrt{2}} & 0 & 0 & 0 & 0 & 0 & 0 \\
0 & 0 & -\frac{1}{\sqrt{2}} & 0 & 0 & 0 & 0 & 0 & 0 & 0 & \frac{1}{\sqrt{2}} & 0 & 0 & 0 & 0 & 0 \\
0 & 0 & 0 & -\frac{1}{\sqrt{2}} & 0 & 0 & 0 & 0 & 0 & 0 & 0 & \frac{1}{\sqrt{2}} & 0 & 0 & 0 & 0 \\
0 & 0 & 0 & 0 & -\cos(\frac{3\pi}{8}) & 0 & 0 & 0 & \cos(\frac{\pi}{8}) & 0 & 0 & 0 & 0 & 0 & 0 & 0 \\
0 & 0 & 0 & 0 & 0 & -\cos(\frac{3\pi}{8}) & 0 & 0 & 0 & \cos(\frac{\pi}{8}) & 0 & 0 & 0 & 0 & 0 & 0 \\
0 & 0 & 0 & 0 & 0 & 0 & -\cos(\frac{3\pi}{8}) & 0 & 0 & 0 & \cos(\frac{\pi}{8}) & 0 & 0 & 0 & 0 & 0 \\
0 & 0 & 0 & 0 & 0 & 0 & 0 & -\cos(\frac{3\pi}{8}) & 0 & 0 & 0 & \cos(\frac{\pi}{8}) & 0 & 0 & 0 & 0
\end{bmatrix}$$

*FIG. 4*

METHODS AND SYSTEMS FOR PERFORMING SHORT INTEGER CHEN IDCT ALGORITHM WITH FUSED MULTIPLY/ADD

This is division of application Ser. No. 09/304,645, filed May 4, 1999 U.S. Pat. No. 6,243,730, which is incorporated herein by reference.

BACKGROUND OF THE INVENTION

The present invention relates generally to media processors, and in particular, is directed to methods and systems for performing the faster two-dimensional inverse discrete cosine transforms (IDCT) in media processors.

A "media processor" is a type of computer which capable of processing video and audio signals. The market demand for fast media processors has increased with the demand for popular entertainment and consumer electronic goods. Typically, multimedia applications handle video and audio signs in real time and are often slow to execute. Media processors, therefore, are often specially designed for a particular application. Conventional media processors, for example, may have such features as a partitioned Single Instruction, Multiple Data (SIMD) architecture, custom instruction set, and wide registers to efficiently perform signal processing of image data. Another technique for improving media processors is to specially design the media processor to perform frequently required, time-intensive operations more efficiently Discrete cosine transforms (DCT) and inverse discrete cosine transform (IDCT) are widely used operations in the signal processing of image data. Both are used, for example, in the international standards for moving picture video compression put forth by the Motion Picture Experts Group (MPEG). DCT has certain properties that produce simplified and efficient coding models. When applied to a matrix of pixel data, the DCT is a method of decomposing a block of data into a weighted sum of spatial frequencies, or DCT coefficients. Conversely, the IDCT is used to transform a matrix of DCT coefficients back to pixel data.

FIG. 1 is a basic flow diagram showing the encoding and decoding processes of a prior art digital video (DV) codec. DV codecs are one example of a device using a DCT-based data compression method. In the blocking stage, the image frame is divided into N by N blocks of pixel information including, for example, brightness and color data for each pixel (stage 100). A common block size is eight pixels horizontally by eight pixels vertically. The pixel blocks are then "shuffled" so that several blocks from different portions of the image are grouped together (stage 110). Shuffling enhances the uniformity of image quality.

Different fields are recorded at different time incidents. For each block of pixel data, a motion detector looks for the difference between two fields of a frame (stage 115). The motion information is sent to the next processing stage (stage 120). In stage 120, pixel information is transformed using a DCT. An 8-8 DCT, for example, takes eight inputs and returns eight outputs in both vertical and horizontal directions. The resulting DCT coefficients are then weighted by multiplying each block of DCT coefficients by weighting constants (stage 125).

The weighted DCT coefficients are quantized in the next stage (stage 140). Quantization rounds off each DCT coefficient within a certain range of values to be the same number (stage 140). Quantizing tends to set the higher frequency components of the frequency matrix to zero, resulting in much less data to be stored. Since the human eye is most sensitive to lower frequencies, however, very little perceptible image quality is lost by this stage.

Quantization stage 140 includes converting the two-dimensional matrix of quantized coefficients to a one-dimensional linear stream of data by reading the matrix values in a zigzag pattern and dividing the one-dimensional linear stream of quantized coefficients into segments, where each segment consists of a string of zero coefficients followed by a non-zero quantized coefficient. Variable length coding (VLC) then is performed by transforming each segment, consisting of the number of zero coefficients and the amplitude of the non-zero coefficient in the segment, into a variable length codeword (stage 145). Finally, a framing process packs every 30 blocks of variable length coded quantized coefficients into five fixed-length synchronization blocks (stage 150).

The lower portion of FIG. 1 shows a basic flow diagram of a prior art DV codec decoding process. Decoding is essentially the reverse of the encoding process described above. The digital stream is first deframed (stage 155). Variable length decoding (VLD) then unpacks the data so that it may be restored to the individual coefficients (stage 160).

After inverse quantizing the coefficients (stage 165), inverse weighting (stage 170) and an inverse discrete cosine transform (EDCT) (stage 175) are applied to the result. The inverse weights are the multiplicative inverses of the weights that were applied in the encoding process. The output of the inverse weighting function is then processed by the IDCT. The IDCT operation may be described mathematically using the following formula:

$$f_{uv} = \frac{2}{N} \sum_{m=0}^{N-1} \sum_{n=0}^{N-1} c(u)c(v) F_{mn} \cos\left(\frac{(2u+1)m\pi}{2N}\right) \cos\left(\frac{(2v+1)n\pi}{2N}\right)$$

where $F_{N \times N}$ is an input matrix of DCT coefficients of size N by N, $f_{N \times N}$ is a output matrix of pixel information of size N by N, and c(u) and c(v) are matrices of constants as defined below.

$$(k) = \frac{1}{\sqrt{2}} \quad \text{if } (k = 0)$$
$$1 \quad \text{if } (k \neq 0)$$

The result is then deshuffled (stage 180) and deblocked (stage 185) to form the full image frame.

Because the DCT and IDCT are widely used, much attention has been devoted to developing fast algorithms for implementing them. Furthermore, there exist many different, but mathematically equivalent, hardware and software implementations for computing the DCT and IDCT. For example, the IDCT equation above can also be written matrix notation as:

$$[f_{N \times N}] = [A_{N \times N}]^T [F_{N \times N}][A_{N \times N}] \quad \text{(Equation 1)}$$

where $[A_{N \times N}]$ is a N×N constant matrix. By applying simple rules of matrix multiplication, two mathematically equivalent matrix notation equations may be derived from Equation 1 as shown below.

$$[f_{N \times N}] = [A_{N \times N}]^T ([A_{N \times N}]^T [F_{N \times N}]^T)^T \quad \text{(Equation 2)}$$

$$[f_{N \times N}] = M([A_{N \times N}]^T \widetilde{s}[A_{N \times N}]^T L([F_{N \times N}]^T)) \quad \text{(Equation 3)}$$

where L is an operation that converts an N×N matrix to a vector according to the equation $L([X_{22}])=[x_{00}\ x_{01}\ x_{10}\ x_{11}]$, M is an operation that converts a vector into a matrix according to the equation $[X_{22}]=M([x_{00}\ x_{01}\ x_{10}\ x_{11}])$, and the symbol ⊗ indicates a tensor product. The tensor product of $[X_{22}]⊗[Y_{22}]$ is defined as, $$[X_{22}] \otimes [Y_{22}] = \begin{bmatrix} X_{00}Y_{00} & X_{00}Y_{01} & X_{01}Y_{00} & X_{01}Y_{01} \\ X_{00}Y_{10} & X_{00}Y_{11} & X_{01}Y_{10} & X_{01}Y_{11} \\ X_{10}Y_{00} & X_{10}Y_{01} & X_{11}Y_{00} & X_{11}Y_{01} \\ X_{10}Y_{10} & X_{10}Y_{11} & X_{11}Y_{10} & X_{11}Y_{11} \end{bmatrix}$$

Equation 2 demonstrates that a two-dimensional IDCT may be computed by multiplying the input data matrix (F) by the constant matrix (A), transposing the result, and then multiplying the transposed matrix by the constant matrix (A). Algorithms that compute two-dimensional IDCTs in this manner are called "type I" algorithms. Type I algorithms are easy to implement on a parallel machine, that is, a computer formed of a plurality of processors operating simultaneously in parallel. For example, when using N parallel processors to perform a matrix multiplication on N×N matrices, N column multiplies can be simultaneously performed. Additionally, a parallel machine can be designed so as to contain special hardware or software instructions for performing fast matrix transposition.

One disadvantage of type I algorithms is that more multiplications are needed. The computation sequence of type I algorithms involves two matrix multiplies separated by a matrix transposition which, if N=4, for example, requires 64 additions and 48 multiplications for a total number of 112 instructions. It is well known by those skilled in the art that multiplications are very time-consuming for processors to perform and that system performance is often optimized by reducing the number of multiplications performed.

Equation 3 above demonstrates that the result of a two-dimensional IDCT can also be obtained by converting the transpose of the input matrix into a one-dimensional vector using the L function. Next, the tensor product $[A_{N\times N}]\otimes[A_{N\times N}]$ of constant matrix $[A_{N\times N}]$ is obtained. Tensor product $[A_{N\times N}]\otimes[A_{N\times N}]$ is then multiplied by the one-dimensional vector, $L([F_{N\times N}])$. The result is converted back into an N×N matrix using the M function. Assuming again that N=4, the total number of instructions used by this computational sequence is 92 instructions (68 additions and 24 multiplications). Algorithms that perform two-dimensional EDCTs using this computational sequence are called "type II" algorithms. In type II algorithms, the two constant matrices are grouped together and performed as one operation. The advantage of type II algorithms is that they typically require fewer instructions (92 versus 112) and, in particular, fewer costly multiplications (24 versus 48). Type II algorithms, however, are very difficult to implement efficiently on a parallel machine. Type II algorithms tend to reorder the data very frequently and reordering data on a parallel machine is very time-intensive.

There exist numerous type I and type II algorithms for implementing IDCTs, however, all suffer from disadvantages that make them inefficient for use in a media processor. As explained above, media processors built using type I algorithms achieve some efficiencies from parallel processing but require too many instructions and, in particular, multiplications. Media processors built using type II algorithms require fewer instructions but cannot be further improved using parallel processing.

The present invention improves the efficiency of implementing an IDCT algorithm by providing methods and apparatus that minimize the number of required instructions. The present invention also provides methods and apparatus for decreasing the number of multiplications without reordering the data thereby allowing efficient implementation on a parallel machine.

SUMMARY OF THE INVENTION

Methods for performing a two-dimensional inverse discrete cosine transform consistent with this invention comprise stages performed by a processor. A processor receives at least one input component representing discrete cosine transform data and combines, in a first stage, the at least one input component with a first set of constants. The input data and first set of constants may be combined, for example, by multiplying the at least one input component with a first set of constants using a complex multiplication instruction. The output is transposed in a second stage and combined with constants in a third stage.

Furthermore, an IDCT apparatus consistent with the present invention comprises an input means, a memory, at least one circuit, and an output means. The input means receives at least one input component representing discrete cosine transform data. The memory stores a first and second set of constants. The at least one circuit combines the input components with the constants in a first stage, transposes the output data, and combines the transposed first-stage output data with the second set of constants in a third stage. The circuit means may comprise, for example, a means for multiplying the at least one input component with a first set of constants using a complex multiplication instruction. The output means for outputting output components representing pixel information of an image.

BRIEF DESCRIPTION OF THE DRAWINGS

The accompanying drawings, which are incorporated in and constitute a part of this specification, illustrate the invention and, together with the description, serve to explain the principles of the invention.

Figure 3:
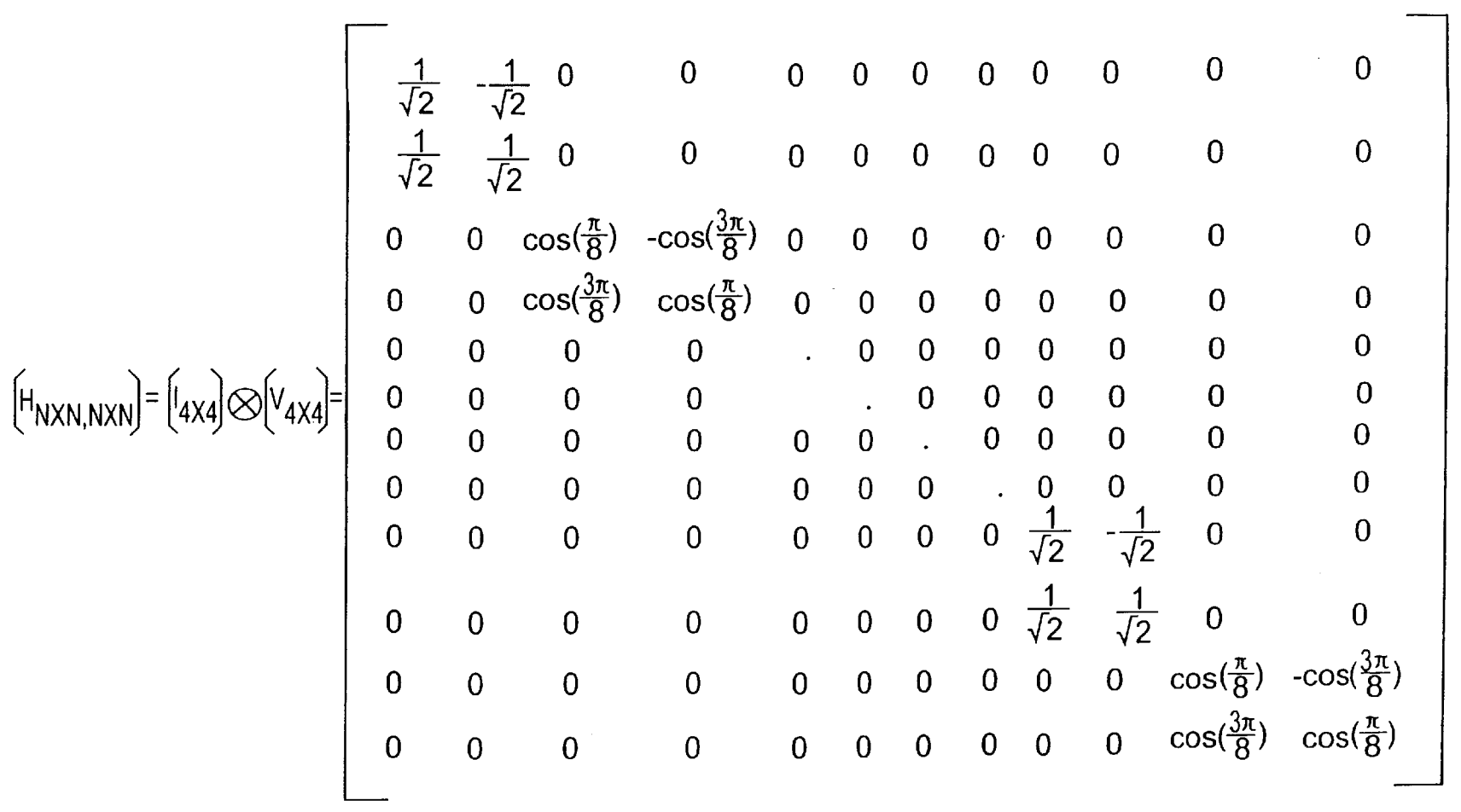

FIG. 3 is an example of matrix, H, which equals the tensor product I⊗V;

FIG. 4 is an example of matrix, G, which equals the tensor product V⊗I;

DESCRIPTION OF THE PREFERRED EMBODIMENTS

Figure 1:
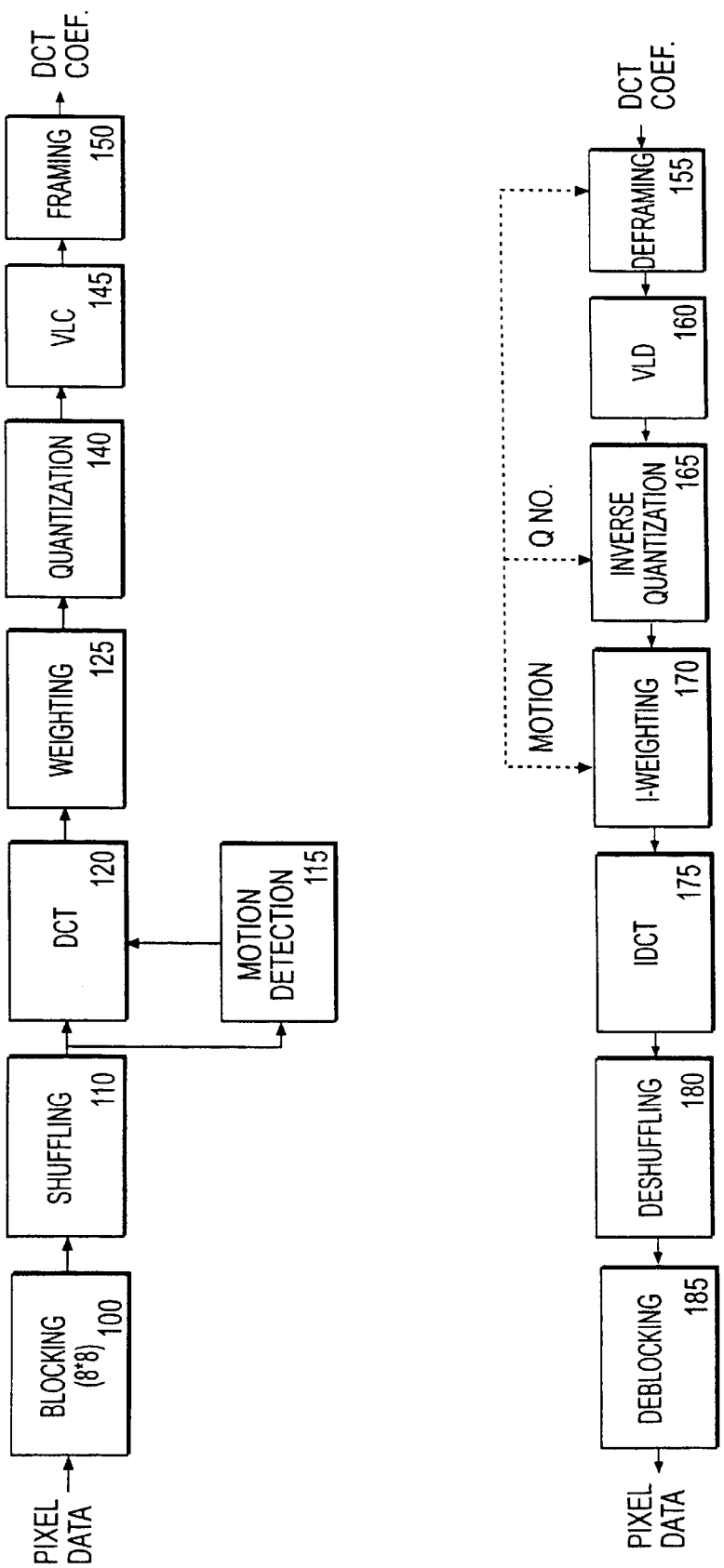
FIG. 1 is a flow diagram of a prior art digital video encoder and decoder.

Reference will now be made in detail to preferred implementations consistent with the present invention, an example of which is illustrated in the accompanying drawings. Wherever possible, the same reference numbers will be used throughout the drawings and the following description to refer to the same or like parts.

A. Introduction

Methods, systems, and articles of manufacture consistent with the present invention include a method of performing a two-dimensional IDCT algorithm that reduces the number of necessary multiplications over other commonly available methods. This method keeps the basic computational sequence of type I algorithms and, therefore, also retains the implementation advantages of type I algorithms. This method retains some of the advantages of type II algorithms by using a type II approach to perform the multiplication of constants.

B. Method

The present invention achieves efficiencies in part by collecting the majority of multiplications performed in calculating an IDCT into one matrix. Multiplications involving this matrix may then be implemented efficiently by using specially equipped media processors.

Mathematically, multiplications may be collected together by capitalizing on the properties of tensor products. As described above, an IDCT may be computed using a type II algorithm of the following form:

$$[f_{N \times N}] = M([A_{N \times N}]^T \otimes [A_{N \times N}]^T L([F_{N \times N}]^T)) \quad \text{(Equation 3)}$$

where $F_{N \times N}$ is an input matrix of DCT coefficients of size N by N, $f_{N \times N}$ is a output matrix of pixel information of size N by N, and $[A_{N \times N}]$ is a N×N constant matrix. In equation 3, the function L converts a two-dimensional vector to a one-dimensional vector. In a type II algorithm such as Equation 3, efficiency is gained in part by computing the two-dimensional IDCT as a one-dimensional IDCT.

Implementations of the computational sequence of Equation 3 may be improved by reducing the number of multiplications necessary to perform the tensor product $[A_{N \times N}] \otimes [A_{N \times N}]$. Mathematically, the constant matrix $[A_{N \times N}]$ may be decomposed into $[U_{N \times N}] [V_{N \times N}]$. Decomposition of a tensor product can be accomplished by decomposing the input matrix into two factor matrices. For example, if $[K]=[X][Y]$, then the decomposition of the tensor product is as follows:

$$[K] \otimes [K] = ([X] \otimes [X])([Y] \otimes [Y])$$

Similarly, the tensor product $[A_{N \times N}] \otimes [A_{N \times N}]$ may be decomposed into $$[A_{N \times N}] \otimes [A_{N \times N}] = ([U_{N \times N}][V_{N \times N}]) \otimes ([U_{N \times N}][V_{N \times N}])$$

$$= ([U_{N \times N}] \otimes [U_{N \times N}])([V_{N \times N}] \otimes [V_{N \times N}])$$

$$= ([U_{N \times N}] \otimes [U_{N \times N}])([VV_{N \times N, N \times N}])$$

where matrix $[U_{N \times N}]$ is a matrix where all the elements are either 1, 0, or −1, that is, a unity matrix. Since all the elements of matrix $[U_{N \times N}]$ are either 1, 0, or −1, multiplication by $[U_{N \times N}]$ effectively requires only addition or subtraction. Computing the constant matrix $[VV_{N \times N, N \times N}]$ therefore involves the majority of the multiplication operations.

Next, multiplication operations in type II algorithms may be consolidated by substituting the unity matrix $[U_{N \times N}]$ and the constant matrix $[VV_{N \times N, N \times N}]$ into a type II equation like Equation 3 in place of the tensor product $[A_{N \times N}] \otimes [A_{N \times N}]$. By replacing the tensor product $[A_{N \times N}] \otimes [A_{N \times N}]$ with $([U_{N \times N}] \otimes [U_{N \times N}])([V_{N \times N}] \otimes [V_{N \times N}])$, Equation 3 equals the following:

$$[f_{N \times N}] = M((([U_{N \times N}] \otimes [U_{N \times N}]) \otimes ([VV_{N \times N, N \times N}])) L([F_{N \times N}]^T))$$

which may be factored into:

$$[f_{N \times N}] = [U_{N \times N}]^T ([U_{N \times N}]^T (M([VV_{N \times N, N \times N}] L([F_{N \times N}]^T)))^T)^T \quad \text{Equation 4}$$

In Equation 4, most of the multiplication stages take place when VV is multiplied by the vector $L([F_{N \times N}]^T)$. Consistent with the present invention, multiplication is done predominantly in one stage thereby reducing the accumulated error due to multiplication to a minimum. As will be shown later, it is then possible to use fewer bits for temporary variables and, as a result, more data can be packed into one register.

Figure 2:
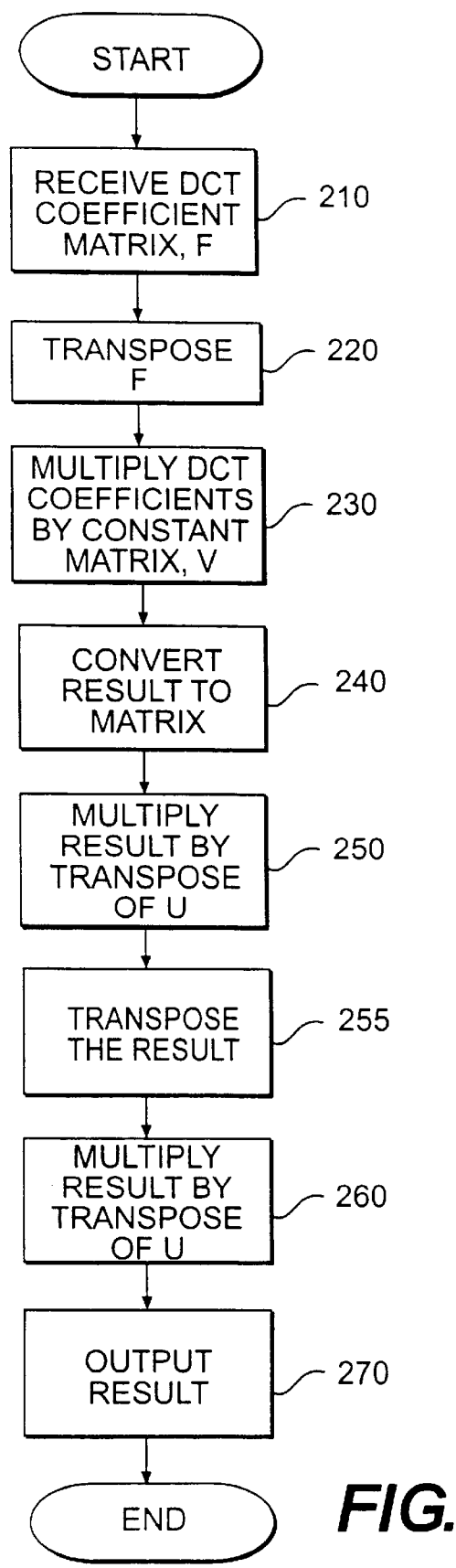
FIG. 2 is a flow diagram illustrate a method for computing an IDCT consistent with the present invention.

FIG. 2 is a flowchart showing the stages for computing pixel information from an input matrix of DCT coefficients of size N×N using Equation 4 as shown above. First, DCT coefficients, $[F_{N \times N}]$, are received (stage 210) and transposed to obtain $[F_{N \times N}^T]$ (stage 220). The transpose of the input matrix of DCT coefficients is converted to a one-dimensional vector using the function $L([X_{NN}])=[x_{00} \, x_{01} \, x_{10} \, x_{11}]$, for N=0 to 1 (stage 225). The one-dimensional vector result is then multiplied with $[V_{N \times N, N \times N}]$, a matrix containing constants (stage 230). The result is will be a one-dimensional vector of length N×N.

The one-dimensional vector result is then converted into a matrix using M, an operation that converts a vector into a matrix according to the equation $[X_{22}]=M([x_{00} \, x_{01} \, x_{10} \, x_{11}])$ (stage 240). The result is then multiplied by the transpose of the unity matrix, U, which contains as entries only 1, 0, or −1 (stage 250). Multiplication by U, therefore, may by accomplished by addition and subtraction. The result is then transposed (stage 255) and multiplied a second time by the transpose of the unity matrix, U, to obtain a matrix of pixel information (stage 260).

In one embodiment of the present invention, faster techniques for computing a one-dimensional DCT are used. For example, in their paper entitled "A Fast Computational Algorithm for the Discrete Cosine Transform," IEEE Transactions on Communications, Vol. Com-25, No. 9, September 1977, pp.1004–09, the authors describe one such method. In the present invention, faster methods for performing the one-dimensional IDCT are combined with the principles of type II algorithms to achieve further improvement. To illustrate the principles of the present invention, begin with the formula for a type II algorithm, as shown below.

$$[f_{N \times N}] = M([A_{N \times N}]^T \otimes [A_{N \times N}]^T L([F_{N \times N}]^T)) \quad \text{(Equation 3)}$$

Mathematically, it is known that the constant matrix $[A_{N \times N}]$ may be written in recursive format as:

$$[A_{N \times N}] = [P_{N \times N}] \begin{bmatrix} \left[\frac{A_N}{2} \times \frac{N}{2}\right] & 0 \\ 0 & \left[\frac{R_N}{2} \times \frac{N}{2}\right] \end{bmatrix} [B_{N \times N}]$$

where $P_{N \times N}$ is an N×N permutation matrix which permutes the transformed vector from bit reversed order to a natural bit order. If a vector in natural bit order contains the elements 00, 01, 10, 11, for example, the same vector in bit reversed order will contain the elements 00, 10, 01, 11. If N=4, then the equation above is equivalent to the following:

$$[A_{4 \times 4}] = [P_{4 \times 4}] \begin{bmatrix} [A_{2 \times 2}] & 0 \\ 0 & [R_{2 \times 2}] \end{bmatrix} [B_{4 \times 4}]$$

which is mathematically equivalent to:

$$[A_{4 \times 4}]^T = [B_{4 \times 4}]^T \begin{bmatrix} [A_{2 \times 2}] & 0 \\ 0 & [R_{2 \times 2}] \end{bmatrix}^T [P_{4 \times 4}]^T$$

Since multiplication by $(P_{N \times N})^T$ merely reorders the input data, it can be performed in a previous or subsequent stage and ignored here. As shown earlier, the constant matrix A can then be factored into matrices U and V such that $$[A_{4 \times 4}] = [U_{4 \times 4}] \, [V_{4 \times 4}] = [B_{4 \times 4}]^T \begin{bmatrix} \lfloor A_{2 \times 2} \rfloor & 0 \\ 0 & [R_{2 \times 2}] \end{bmatrix}^T$$

where U equals a matrix whose elements are 0, 1, and −1 such as, for example, the matrix U shown below.

$$[U_{4 \times 4}] = \begin{bmatrix} 1 & 0 & 0 & -1 \\ 0 & 1 & -1 & 0 \\ 0 & 1 & 1 & 0 \\ 1 & 0 & 0 & 1 \end{bmatrix}$$

and V is a matrix containing constant values such as, for example, the matrix V shown below.

$$[V_{4 \times 4}] = \begin{bmatrix} \frac{1}{\sqrt{2}} & -\frac{1}{\sqrt{2}} & 0 & 0 \\ \frac{1}{\sqrt{2}} & \frac{1}{\sqrt{2}} & 0 & 0 \\ 0 & 0 & \cos\frac{\pi}{8} & -\cos\left(\frac{3\pi}{8}\right) \\ 0 & 0 & \cos\left(\frac{3\pi}{8}\right) & \cos\left(\frac{3\pi}{8}\right) \end{bmatrix}$$

As a result, multiplication by matrix $[V_{4 \times 4}]$ requires multiplication by constant values, however, multiplication by matrix $[U_{4 \times 4}]$ may be accomplished using only addition operations. If U nad V are substituted into a type II algorithm like Equation 3, then Equation 3 becomes:

$$[f_{4 \times 4}] = [U_{4 \times 4}]^T ([U_{4 \times 4}]^T M ([VV_{4 \times 4, 4 \times 4}] L (P_{4 \times 4})^T [F_{4 \times 4}]^T))^T) \quad \text{Equation 5}$$

where $[VV_{4 \times 4, 4 \times 4}]$ equals the tensor product $[V_{N \times N}] \otimes [V_{N \times N}]$. Using the the decomposition technique described above, $[VV_{4 \times 4, 4 \times 4}]$ can be decomposed according to the following:

$$VV_{4 \times 4, 4 \times 4} = ([V_{4 \times 4}][I_{4 \times 4}]) \otimes ([I_{4 \times 4}][V_{4 \times 4}]) = ([V_{4 \times 4}] \otimes [I_{4 \times 4}])$$
$$([I_{4 \times 4}] \otimes [V_{4 \times 4}])$$

where $I_{4 \times 4}$ is a 4 by 4 identity matrix containing all zero entries except for ones along the diagonal. Using the constant matrix, V, above as an example, the tensor product of the identity matrix, I, with V is a matrix, H, of constants as is shown in FIG. 3. The tensor product $[V_{N \times N}] \otimes [I_{N \times N}]$ equals with equals a matrix, G, an example of which is shown in FIG. 4. $[VV_{4 \times 4, 4 \times 4}]$ equals the product of G and H. Substituting G and H into Equation 5 results in the following equation:

$$[f_{4 \times 4}] = [U_{4 \times 4}]^T ([U_{4 \times 4}]^T M ([G_{4 \times 4, 4 \times 4}] [H_{4 \times 4, 4 \times 4}] L (P_{4 \times 4})^T [F_{4 \times 4}]^T)) \quad \text{Equation 6}$$

Figure 5:
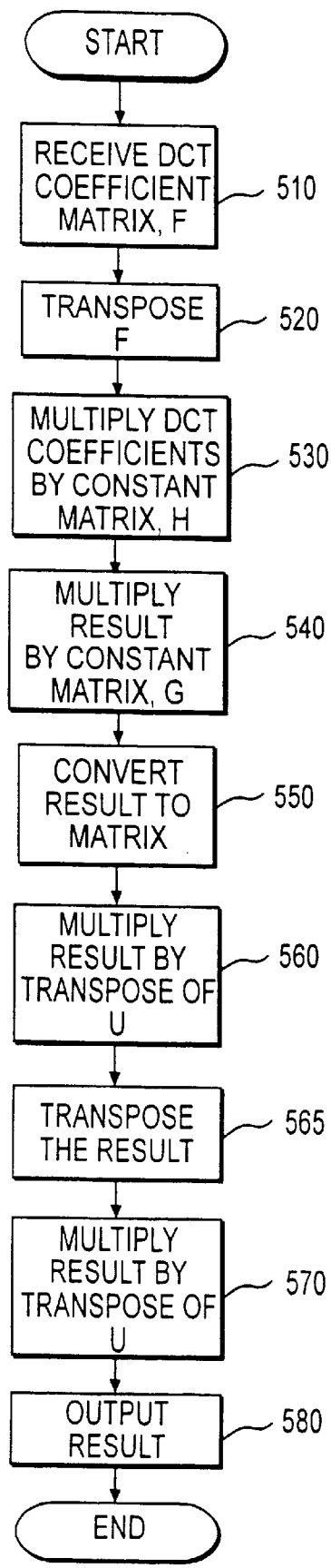
FIG. 5 is a flow diagram illustrating a method for computing an IDCT consistent with the present invention.

Equation 6 may be implemented using a media processor with partitioned SIMD architecture. FIG. 5 is a flowchart showing the stages for computing pixel information from an input matrix of DCT coefficients of size N×N using a method consistent with the present invention. First, the DCT coefficients are received (stage 510). The transpose of the input matrix of DCT coefficients, F, is reordered by multiplying F by the matrix, P (stage 520). If the DCT coefficients received in stage 510 are reordered before being received, the method proceeds with stage 530.

Figure 6:
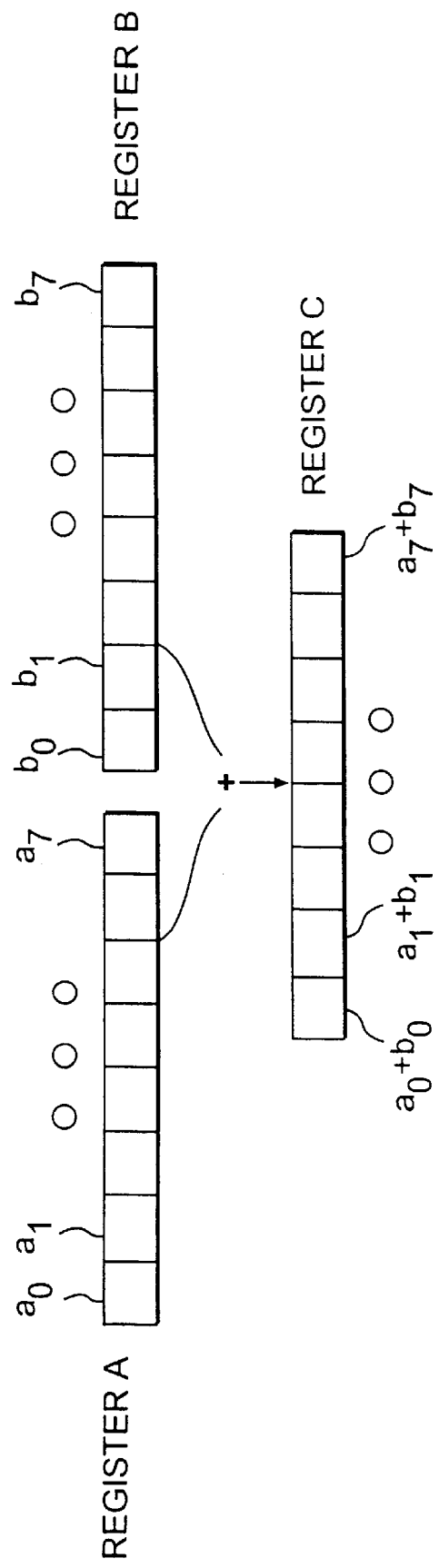
FIG. 6 is a diagram illustrating an operation as performed by a processor with partitioned SIMD architecture.

Next, the reordered DCT coefficients are multiplied by the constant matrix $[H_{N \times N}]$ (stage 530). In embodiments consistent with the present invention, this multiplication is performed on a media processor with a partitioned SIMD architecture. In a processor with partitioned SIMD architecture, two or more values may be packed into one register. As shown in FIG. 6, values $a_0, a_1, \ldots a_7$ are packed into register A and values $b_0, b_1, \ldots b_7$ are packed into register B. An instruction such as add(a,b,c) will add the contents of register A to the contents of register B and store the results in register C. C then contains the values $a_0+b_0, a_1+b_1, \ldots a_7+b_7$.

FIG. 6 shows the addition of two registers containing multiple values, but other mathematical operations may be performed in a similar manner. There may exist, for example, a single instruction that directs a processor to multiply Register A in FIG. 6 by Register B and store the result in Register C. The contents of Register C would then contain, for example, $a_0*b_0, a_1*b_1, \ldots, a_n*b_n$.

Many media processors with a partitioned SIMD architecture contain an instruction for performing complex multiplication using one instruction. Complex multiplication is defined as the multiplication of two complex numbers, each number containing a real and imaginary part. For example, if $A=A\text{real}+i*A\text{image}$ $B=B\text{real}+i*B\text{image}$ then to compute $C=C\text{real}+i*C\text{image}$, the following two operations are performed.

Figure 7:
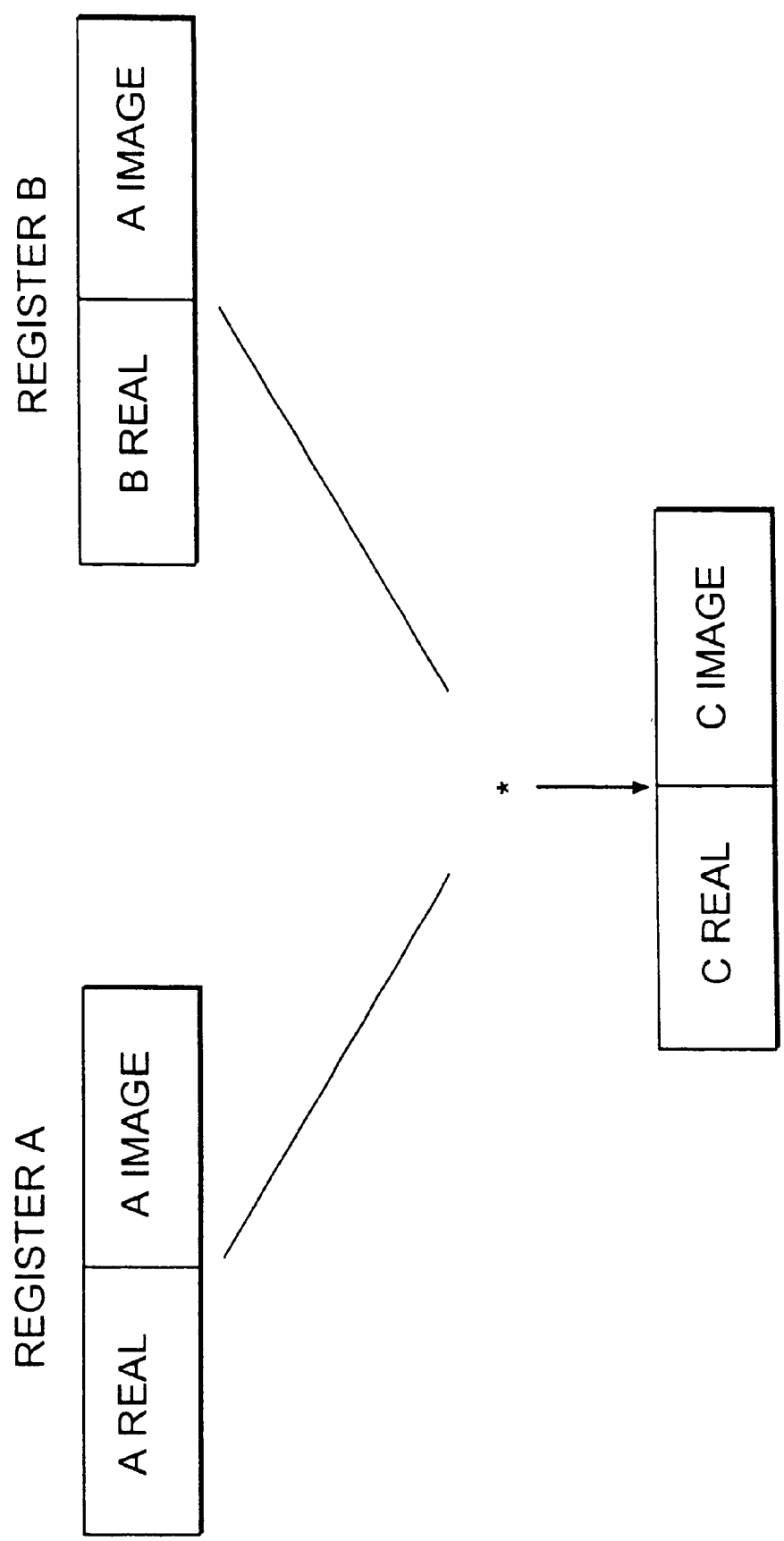
FIG. 7 is a diagram showing a complex multiplication as executed on a partitioned SIMD architecture.

$C\text{real}=A\text{real}*B\text{real}-A\text{image}*B\text{image}$ $C\text{image}=A\text{real}*B\text{image}+A\text{image}*B\text{real}$ Creal equals the product of the first parts minus the product of the second parts. Cimage equals the produce of the first parts plus the product of the second parts. In a conventional media processor with a complex instruction capability, Creal and Cimage are computed using one instruction, even though four multiplications and two additions are performed. FIG. 7 shows the complex multiplication instruction as executed by a partitioned SIM architecture.

Figure 8:
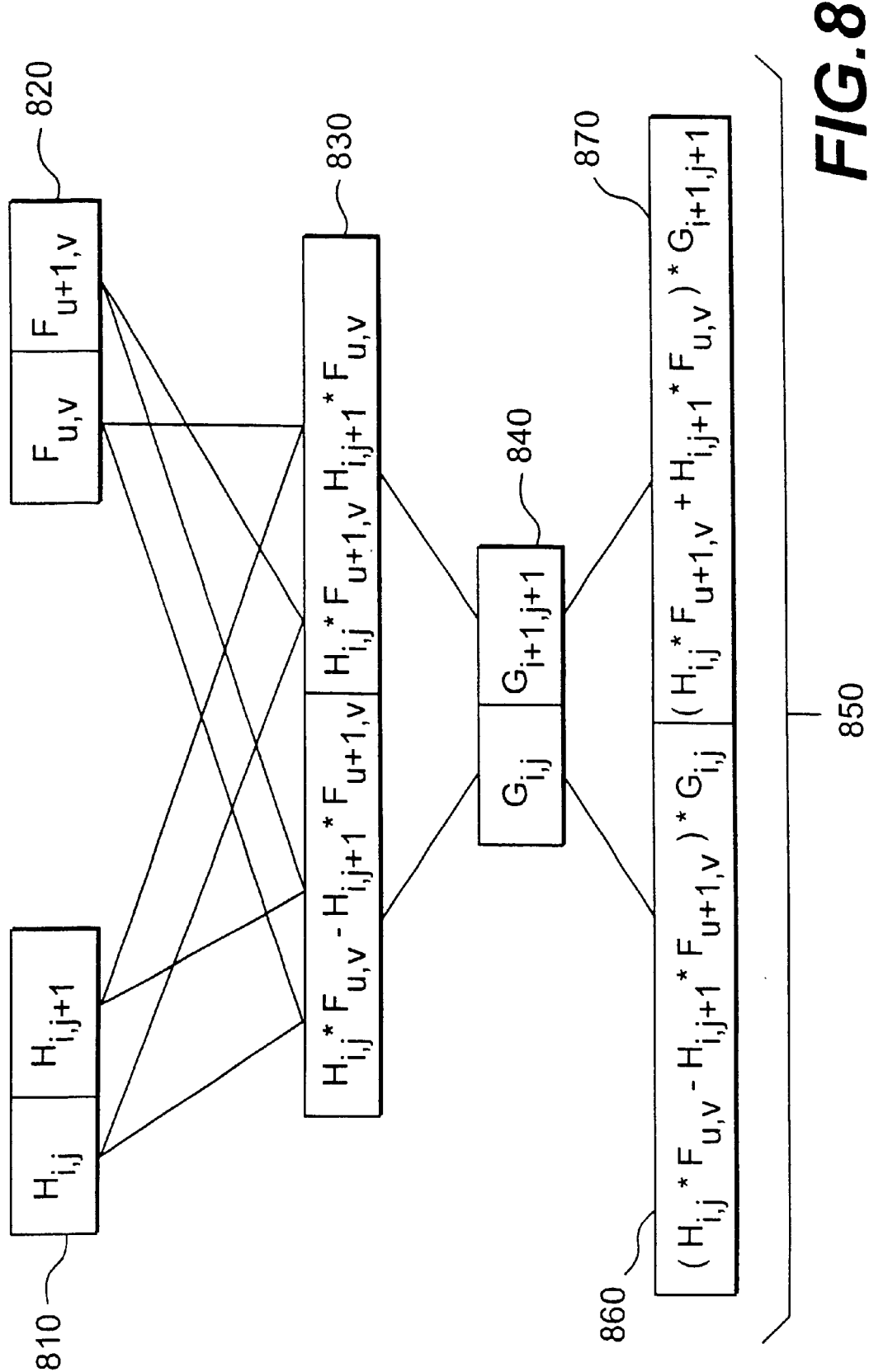
FIG. 8 is a diagram showing the use of a partitioned SIMD architecture in implementing principles consistent with the present invention.

FIG. 8 illustrates use of a partitioned SIMD architecture in implementing the multiplication of F by H as is consistent with the present invention. $H_{ij}$ and $-H_{ij+1}$ may be packed into register 810 while $F_{u,v}$ and $F_{u+1,v}$ are packed into register 820. The contents of register 810 and register 820 are combined and the result is stored in register 830. In a media processor containing a single instruction for performing complex multiplication, H and F may be combined using a single complex instruction. As displayed in register 830, the first part of register 830 contains the product of the first parts of registers 810 and 820 minus the product of the second parts. The second part of register 830 contains the product of the first parts plus the products of the second parts. Multiplication by the matrix $[H_{N \times N}]$ in this manner, as shown in FIG. 8, can be done using 16 operations.

The result from stage 530 (FIG. 5), stored in register 830 (FIG. 8), is then multiplied by $[G_{N \times N}]$ (stage 540). As earlier, $G_{ij}$ and $G_{i+1 j+1}$ can be packed into one register 840. The contents of register 840 can then be combined with the contents of register 830 using a simple multiplication instruction. The result is stored in register 850. First part 860 contains the product of the first part of register 830 and the first part of register 840. Second part 870 contains the product of the second part of register 830 and the second part of register 840. The multiplication of matrix $[G_{N \times N}]$ with the previous results can be accomplished using 16 operations plus some additions.

The result following stage 540 (FIG. 5) will be a one-dimensional vector of length N×N. The one-dimensional vector result is then converted into a matrix using M, an operation that converts a vector into a matrix according to the equation $[X_{22}]=M([x_{00} \ x_{01} \ x_{10} \ x_{11}])$ (stage 550). The result is then multiplied by the transpose of the unity matrix, U, which contains as entries only 1, 0, or −1 (stage 560). Multiplication by U, therefore, may by accomplished by addition and subtraction. The result is then transposed (stage 565) and multiplied a second time by the transpose of the unity matrix, U, to obtain a matrix of pixel information (stage 570). Pixel coefficients are then output (stage 580).

Figure 9:
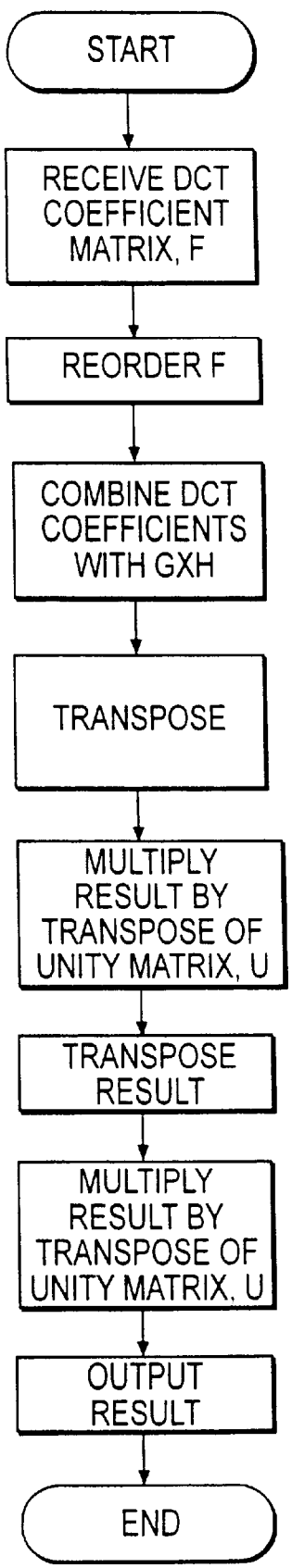
FIG. 9 is a flow diagram illustrating a method for computing an IDCT consistent with the present invention.
Figure 10:
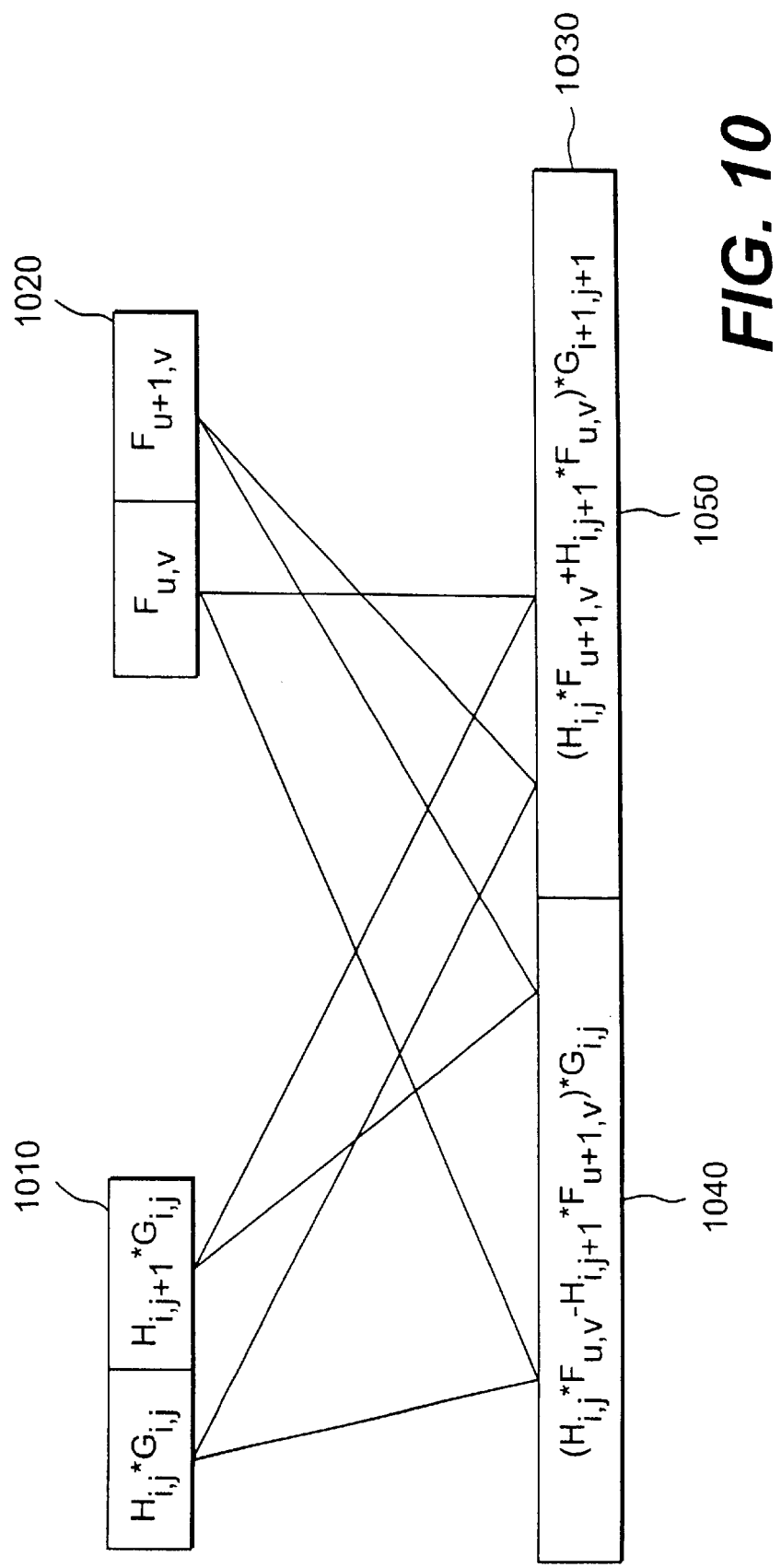
FIG. 10 is a diagram showing the use of a partitioned SIMD architecture in implementing principles consistent with the present invention.
Figure 11:
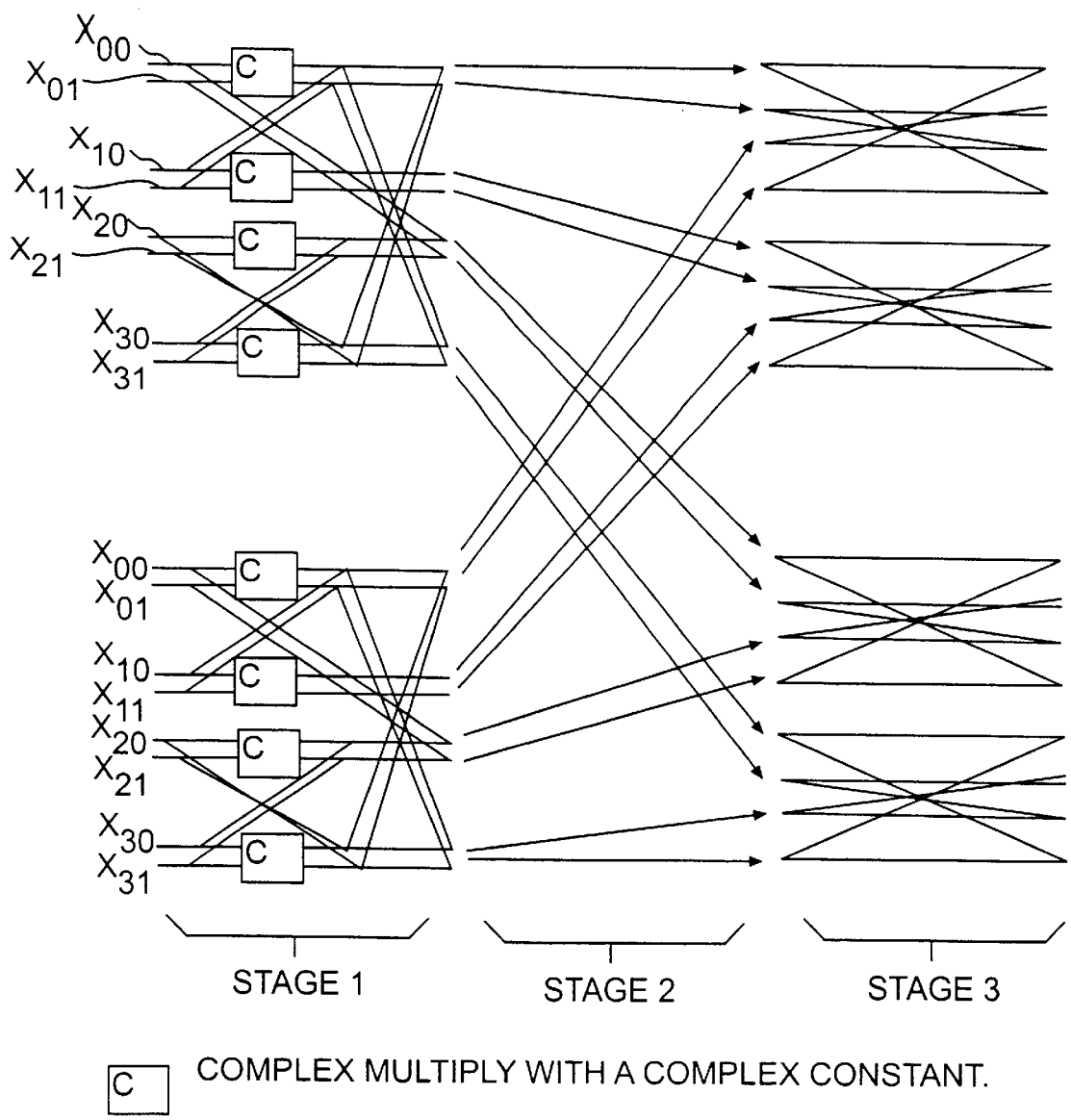
FIG. 11 is a signal flow diagram (also known as a "butterfly diagram") of a fast IDCT algorithm to be performed by the IDCT apparatus of the present invention.

FIG. 9 shows the stages of implementing another method of computing the IDCT using a media processor with partitioned SIMD architecture based on Equation 6. FIG. 10 shows the use of a partitioned SIMD architecture in implementing principles consistent with the present invention. FIG. 11 is a signal flow diagram (also known as a "butterfly diagram") of a fast IDCT algorithm to be performed by the DCT apparatus of the present invention. In FIG. 11, input data flows from left to right. A diagonal line connecting two inputs indicates that the inputs are added together. An arrowhead indicates that the additive inverse of the result at the point of the arrow head is computed before the next calculation. The letter "C" in the box indicates that the result at the left end of the line segment is multiplied by a constant in a complex multiplication operation.

In Equation 6, below, matrices U, G, and H all contain constants. The matrices $$[f_{4\times 4}]=[U_{4\times 4}]^T([U_{4\times 4}]^T M([G_{4\times 4, 4\times 4}][H_{4\times 4, 4\times 4}]L([P_{4\times 4}]^T [F_{4\times 4}]^T))^T)^T \quad \text{Equation 6}$$

G and H can therefore be combined and stored in memory prior to performance of this method. The product $U_{4\times 4}{}^T([U_{4\times 4}]^T)$ may also be computed earlier and stored in memory. Furthermore, the product $U_{4\times 4}{}^T ([U_{4\times 4}]^T)$ will be also be a unity matrix, $U'_{4\times 4}$, that contains all 0 and 1 entries.

The principles of the present invention, as described by Equation 6, may then be implemented in the following manner as shown in FIG. 9 with reference to FIGS. 10 and 11. In stage one, an N×N matrix of input components representing DCT coefficients, F, are received (stage 910). Assuming for the sake of this example that N equals 4, sixteen inputs ($x_{00}$, $x_{01}$, ... $x_{33}$) are received as shown in FIG. 11. The input matrix, F, is reordered to prepare the input data for complex multiplication (stage 920). In FIG. 11, for example, the inputs ($x_{00}$, $x_{01}$, ... $x_{33}$) are shown already reordered so that they may be easily grouped into pairs.

Returning now to FIG. 9, the reordered input data is then combined with the constant matrix G*H (stage 930). In a media processor with partitioned SIMD architecture and a complex multiply instruction, this multiply may be performed using one instruction. For example, as shown in FIG. 10, the quantities $H_{ij}*G_{ij}$ and $H_{ij+1}*G_{ij+1}$ may be packed into register 810 while the quantities $F_{u,v}$ and $F_{u+1,v}$ are packed into register 820. The contents of register 810 and register 820 are combined and the result is stored in register 830. In a media processor containing a single instruction for performing complex multiplication, as described above and illustrated in FIG. 5, the quantities H*G and F may be combined using the single complex instruction. As displayed in register 830, the first part of register 830 contains the product of the first parts of registers 810 and 820 minus the product of the second parts. The second part 850 of register 830 contains the product of the first parts plus the products of the second parts. The multiplication of H*G*F in this manner as shown in FIG. 10 can be done using 16 complex operations.

Referring now to FIG. 11, the first stage illustrates an implementation of a complex multiplication on the reordered data. In the second stage, the data constituting the results following stage 930 (FIG. 9) is then reordered by transposition (stage 940). The transposed data is then multiplied by the transpose of the unity matrix, U (stage 950). As explained earlier, the unity matrix contains as entries only 1, 0, or −1. Multiplication by U, therefore, may by accomplished by addition and subtraction. FIG. 11 indicates the addition and subtraction with butterfly operations. The result is transposed (stage 952) and multiplied by U transpose (stage 954). The resulting pixel information is output to the next apparatus (stage 970).

The implementation illustrated by FIGS. 9, 10, and 11 for N=4, for example, requires 16 complex multiplications (each involving 2 multiplications and an addition) plus two additional simple multiplications. The total number of instructions using principles of the present invention is 50, a significant improvement over the 112 instructions using only a type I algorithm implementation and 92 instructions for type II algorithm implementation.

C. System

Figure 12:
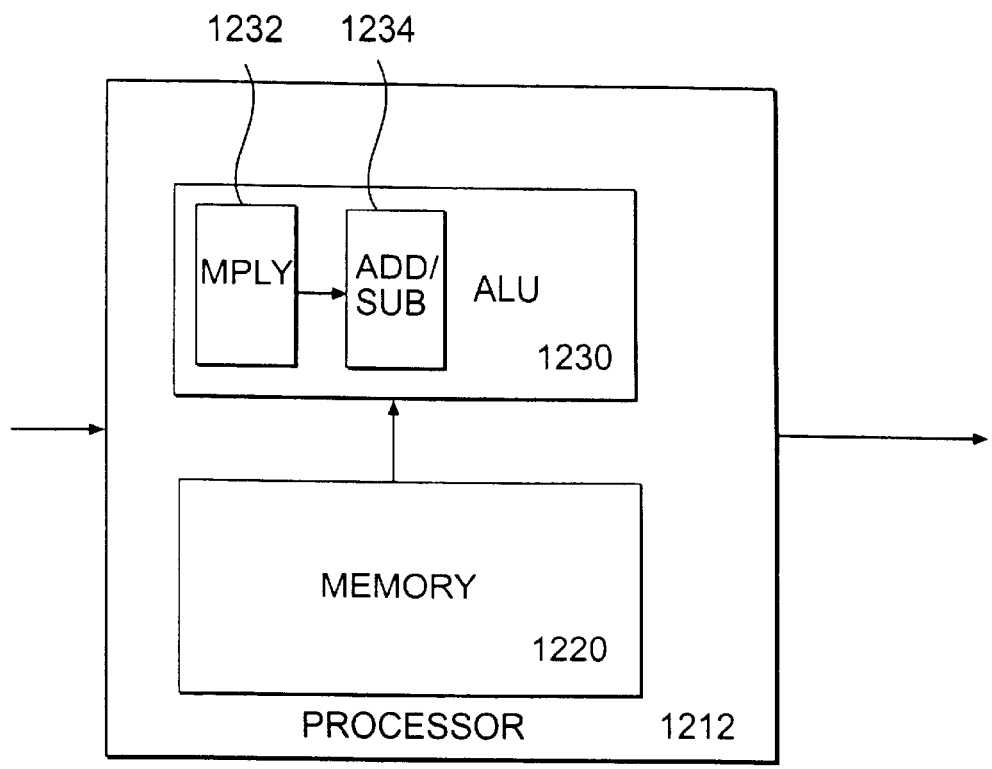
FIG. 12 shows an apparatus for carrying out a method consistent with the present invention.

FIG. 12 shows an apparatus for performing a two-dimensional IDCT consistent with the present invention. As shown in FIG. 12, the DCT apparatus 1210 comprises a memory 1220 and arithmetic logic unit (ALU) 1230. ALU 1230 is a processor capable of receiving inputs and performing arithmetic and logical operations on the received data. As shown in FIG. 12, ALU 1230 may comprise one or more multiplier circuits 1232 and one or more addition/subtraction circuits 1234. The memory may be a read-only memory (ROM) that stores constant coefficients that may be input to multiplier circuit 1232.

Figure 13:
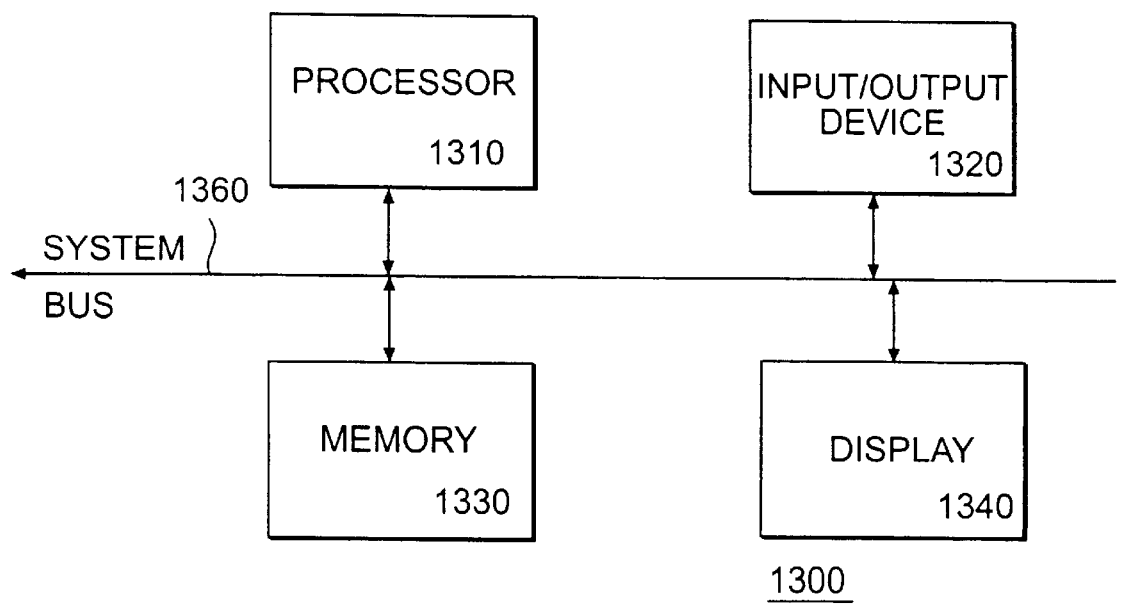
FIG. 13 shows a block diagram of an exemplary multi-processor computer system in which application programs written in a manner consistent with the present invention may be implemented.

Furthermore, the principles of the present invention may be implemented using a system as shown in FIG. 13. As shown in FIG. 13, system 1300 contains a processor 1310 connected to at least one input/output (I/O) device 1320 via any suitable system bus 1360. I/O device 1320 can be any device capable of passing information to or receiving data from processor 1310. By way of example only, I/O device 1320 may be a digital camcoder connected through IEEE 1394 interface. Processor 1310 may be any commonly available processor such as, for example, a Pentium. Faster processors, however, will decrease execution time of the invention.

The system of the present invention also includes memory 1330, which may store the data being processed by processor 1310 and the data being sent to or received from I/O device 1320. Processor 1310, I/O device 1320, and memory 1330 are connected via standard system bus 1360. FIG. 13 shows an exemplary network where each hardware component may be implemented by conventional, commercially available computer systems components.

D. Conclusion

Methods and apparatus consistent with the present invention may be implemented in software, hardware, or a combination of hardware and software. Software implementations of the invention are preferably embodied in a computer-readable media, such as a magnetic disk, or transferred over computer-readable media, such as the Internet.

It will be apparent to those skilled in the art that various modifications and variations can be made in the methods and systems consistent with the present invention without departing from the spirit or scope of the invention. For example, the DCT matrix is orthogonal and therefore its inverse is its transpose. Any matrix calculation performed for the IDCT may be easily transformed into a comparable method suitable for use in calculating a DCT. The true scope of the claims is defined by the following claims.

What is claimed is:

1. A method for performing an inverse discrete cosine transform, performed by a processor that generates intermediate values, comprising the stages of:
   (a) receiving discrete cosine transform data representing weighted spatial frequencies of image data;
   (b) combining, in a first stage, the discrete cosine transform data with a first set of constants to obtain first-stage output data;
   (c) combining, in a second stage, the first-stage output data with a second set of constants to obtain second-stage output data;
   (d) transposing the second-stage output data in a third stage;
   (e) combining, in a fourth stage, the transposed second-stage output data with a third set of constants, wherein all elements of the second set of constants are 0, 1, or −1; and
   (f) outputting output components representing pixel information of an image.

2. The method of claim 1, wherein combining in a first stage includes:
   multiplying using a complex multiplication instruction the discrete cosine transform data with a first set of constants to obtain first-stage output data.

3. The method of claim 1, wherein combining, in a second stage, the first-stage output data includes:
   multiplying, in a second stage, the first-stage output data with a second set of constants to obtain second-stage output data.

4. The method of claim 1, wherein combining, in a third stage, includes:
   combining the transposed second-stage output data with a third set of constants using addition or subtraction.

5. An IDCT apparatus comprising:
   an input means for receiving discrete cosine transform cosine transform data representing weighted spatial frequencies of image data;
   a memory for storing a first, second, and third set of constants, wherein all elements of the third set of constants are 0, 1, or −1;
   at least one circuit for:
      combining, in a first stage, the discrete cosine transform data with the first set of constants to obtain first-stage output data;
      combining, in a second stage, the first-stage output data with the second set of constants to obtain second-stage output data;
      transposing the second-stage output data in a third stage;
      combining, in a fourth stage, the transposed second-stage output data with the third set of constants; and
   an output means for outputting pixel information of an image.

6. The apparatus of claim 5, wherein the at least one circuit includes:
   a multiplier circuit for multiplying using a complex multiplication instruction the discrete cosine transform data with a first set of constants to obtain first-stage output data.

7. The apparatus of claim 5, wherein the at least one circuit includes:
   a multiplier circuit for multiplying, in a second stage, the first-stage output data with a second set of constants to obtain second-stage output data.

8. The apparatus of claim 5, wherein the at least one circuit includes:
   an adder or subtractor circuit for combining the transposed second-stage output data with a third set of constants using addition or subtraction.

9. A system for performing an inverse discrete cosine transform comprises:
   (a) means for receiving discrete cosine transform data representing weighted spatial frequencies of image data;
   (b) means for combining, in a first stage, the discrete cosine transform data with a first set of constants to obtain first-stage output data;
   (c) means for combining, in a second stage, the first-stage output data with a second set of constants to obtain second-stage output data;
   (d) means for transposing the second-stage output data in a third stage;
   (e) means for combining, in a fourth stage, the transposed second-stage output data by a third set of constants, wherein all elements of the second set of constants are 0, 1, or −1; and
   (f) means for outputting pixel information of an image.

10. The system of claim 9, wherein means for combining in a first stage includes:
   means for multiplying using a complex multiplication instruction the discrete cosine transform data with a first set of constants to obtain first-stage output data.

11. The system of claim 9, wherein means for combining, in a second stage, the first-stage output data includes:
   means for multiplying, in a second stage, the first-stage output data with a second set of constants to obtain second-stage output data.

12. The system of claim 9, wherein means for combining, in a third stage, includes:
   means for combining the transposed second-stage output data with a third set of constants using addition or subtraction.

* * * * *